(12) United States Patent
Takagi et al.

(10) Patent No.: US 7,167,040 B2
(45) Date of Patent: Jan. 23, 2007

(54) VOLTAGE BOOSTER DEVICE HAVING VOLTAGE-SUPPRESSING CIRCUIT

(75) Inventors: Nobutomo Takagi, Okazaki (JP); Yasuhiro Tanaka, Kariya (JP); Takayuki Yamanaka, Kariya (JP); Mitsuru Terasaki, Kariya (JP)

(73) Assignee: Denso Corporation, Kariya (JP)

( * ) Notice: Subject to any disclaimer, the term of this patent is extended or adjusted under 35 U.S.C. 154(b) by 133 days.

(21) Appl. No.: 10/995,502

(22) Filed: Nov. 24, 2004

(65) Prior Publication Data

US 2005/0127983 A1 Jun. 16, 2005

(30) Foreign Application Priority Data

Dec. 11, 2003 (JP) .............................. 2003-413490

(51) Int. Cl.
*G05F 1/10* (2006.01)

(52) U.S. Cl. .................................................... 327/536

(58) Field of Classification Search ................ 323/222, 323/229; 327/390, 536, 589
See application file for complete search history.

(56) References Cited

U.S. PATENT DOCUMENTS

| | | | | |
|---|---|---|---|---|
| 4,322,787 A | * | 3/1982 | Kraus | 323/222 |
| 5,408,203 A | * | 4/1995 | Okano et al. | 331/143 |
| 5,889,390 A | * | 3/1999 | Preis et al. | 323/222 |
| 6,178,104 B1 | * | 1/2001 | Choi | 363/89 |
| 6,259,236 B1 | * | 7/2001 | Higuchi | 323/222 |
| 6,538,494 B1 | * | 3/2003 | Zimlich | 327/537 |
| 6,909,249 B1 | * | 6/2005 | Otake | 315/291 |
| 6,998,732 B1 | * | 2/2006 | Xing et al. | 307/45 |
| 2004/0212420 A1 | * | 10/2004 | Otake | 327/536 |
| 2005/0052222 A1 | * | 3/2005 | Ootani et al. | 327/536 |

FOREIGN PATENT DOCUMENTS

| | | |
|---|---|---|
| JP | A-6-205581 | 7/1994 |
| JP | A-8-126305 | 5/1996 |
| JP | A-9-74666 | 3/1997 |
| JP | A-9-186530 | 7/1997 |

* cited by examiner

*Primary Examiner*—Jeffrey Zweizig
(74) *Attorney, Agent, or Firm*—Posz Law Group PLC

(57) ABSTRACT

A voltage booster device includes a booster circuit for boosting a power source voltage such as a battery voltage, a voltage-suppressing circuit for suppressing operation of the booster circuit when the boosted voltage reaches a predetermined voltage such as a Zener voltage of a Zener diode included in the voltage-suppressing circuit, and a control circuit having a microcomputer for supplying a voltage-boosting signal when the power source voltage is lower than a predetermined minimum voltage. When the power source voltage is lower than the minimum voltage, the power source voltage is boosted. When the boosted voltage reaches the predetermined voltage such as the Zener voltage, the level of the boosted voltage is kept constant at the level of the predetermined voltage.

6 Claims, 4 Drawing Sheets

VOLTAGE BOOSTER DEVICE HAVING VOLTAGE-SUPPRESSING CIRCUIT

CROSS-REFERENCE TO RELATED APPLICATION

This application is based upon and claims benefit of priority of Japanese Patent Application No. 2003-413490 filed on Dec. 11, 2003, the content of which is incorporated herein by reference.

BACKGROUND OF THE INVENTION

1. Field of the Invention

The present invention relates to a device for boosting a direct current power source voltage to a certain level, and more particularly to such a device mounted on an automotive vehicle for boosting a voltage of an on-board battery.

2. Description of Related Art

A 12-volt battery is usually mounted on an automotive vehicle and is used for various purposes such as starting an engine and supplying power to on-board electrical devices. The voltage of the battery is boosted for supplying a higher voltage to particular devices. An example of such a voltage booster is shown in JP-A-9-74666.

A voltage booster device shown in FIG. 4A attached hereto has been known hitherto. The voltage booster device 110 is composed of: a booster circuit 111 for boosting a direct current power source voltage VB and for outputting an output voltage Vout from an output terminal 121; and a microcomputer 113 for monitoring the output voltage Vout and for supplying voltage-boosting signals according to the monitored output voltage Vout to the booster circuit 111. The booster circuit 111 includes a field effect transistor (FET) M11, a coil L11, a pair of reverse-current-preventing diodes D12, D13, a diode D11, an input capacitor C12, a smoothing capacitor C11, and a resistor R11. These components are connected as shown in FIG. 4A. That is, a drain of the FET M11 is connected to a junction of the coil L11 and the reverse-current-preventing diode D13. A gate of the FET M11 is grounded through the resistor R11, and a source of the FET M11 is grounded.

The microcomputer 113 supplies voltage-boosting signals in a form of pulse-width-modulated signals (PWM) to the gate of the FET M11. The PWM signals are supplied when the output voltage Vout becomes lower than the minimum voltage Vmin at which the voltage-boosting is started, and the supply of the PWM signals is stopped when the output voltage Vout reaches the maximum voltage Vmax at which the voltage-boosting is terminated. In response to the PWM signals, the FET M11 is switched on and off repeatedly. Upon turning on the FET M11, current is supplied to the coil L11, and energy is accumulated in the coil L11. Upon turning off the FET M11, the energy accumulated in the coil L11 is discharged to the output terminal 121 through the diode D13. Thus, the output voltage Vout increases while the PWM signals are present, and decreases when the PWM signals disappear. As a result, the output voltage Vout varies as shown in FIG. 4B.

The voltage booster device 110 constructed as above operates in the following manner. When the power source voltage VB is higher than the minimum voltage Vmin, the power source voltage VB is directly supplied to the output terminal 121 through the diode D11. Therefore, the output voltage Vout is equal to the power source voltage VB. On the other hand, when the output voltage Vout decreases to the level of the minimum voltage Vmin according to decrease in the power source voltage VB, the power source voltage VB is boosted in the manner as described above and the boosted voltage is supplied to the output terminal 121. Thus, the output voltage Vout is kept between Vmin and Vmax.

However, in the conventional voltage booster device 110 described above, the following problems are involved. Since the output voltage Vout varies as shown in FIG. 4B during the voltage-boosting operation, it is highly possible that noises are generated in the booster circuit in accordance with the changes in the output voltage Vout. Further, in case the voltage-boosting signals (PWM signals) are continued to be generated due to failure or trouble in the microcomputer 113, the voltage-boosting continues after the output voltage Vout reaches the maximum voltage Vmax. If the output voltage Vout exceeds a permissible maximum voltage in the voltage booster device 110, the device 110 may be fatally damaged.

SUMMARY OF THE INVENTION

The present invention has been made in view of the above-mentioned problems, and an object of the present invention is to provide an improved voltage booster device, wherein changes in the output voltage during boosting operation are suppressed and any possible damages in the device due to failures in a microcomputer are avoided.

A direct current power source voltage such as a battery voltage is boosted by a voltage booster device. The voltage booster device is composed of a booster circuit including a coil and a field effect transistor, an output circuit for outputting either the power source voltage or a voltage boosted by the booster circuit, a voltage suppressing circuit including a Zener diode, and a control circuit including a microcomputer for supplying a voltage-boosting signal to the booster circuit.

When the power source voltage is lower than a predetermined voltage, the control circuit supplies a voltage-boosting signal (a pulse-width-modulated signal) to a gate of the field effect transistor to boost the power source voltage by switching the field effect transistor. When the boosted voltage (an output voltage) becomes higher than a Zener voltage of the Zener diode, the Zener diode becomes conductive to bring the gate voltage of the field effect transistor to a low level, irrespective of the voltage level of the voltage-boosting signal.

The output voltage during the boosting operation is kept constant at the level of the Zener voltage by operation of the voltage-suppressing circuit. Therefore, the changes in the output voltage during the boosting operation are suppressed. Further, the voltage booster device is prevented from any damages due to over-voltage that may be caused by malfunctions in the control circuit because the level of the boosted voltage is limited to the level of the Zener voltage.

Two Zener diodes having respectively different Zener voltages may be used in the voltage-suppressing circuit, so that the voltage-boosting operation is suppressed when either one of the Zener diodes becomes conductive. In this manner, the voltage booster device is further surely protected from the over-voltage because the voltage-boosting operation is suppressed by one Zener diode even if the other the Zener diode becomes inoperative. The voltage booster device according to the present invention may be used in a power source system mounted on an automotive vehicle. In this case, the boosting operation may be prohibited when an ignition key is turned off to reduce power consumption in the voltage booster device. The Zener diode may be replaced with a switching element, switching operation of which is controlled by the control circuit.

DETAILED DESCRIPTION OF THE PREFERRED EMBODIMENTS

Figure 1:
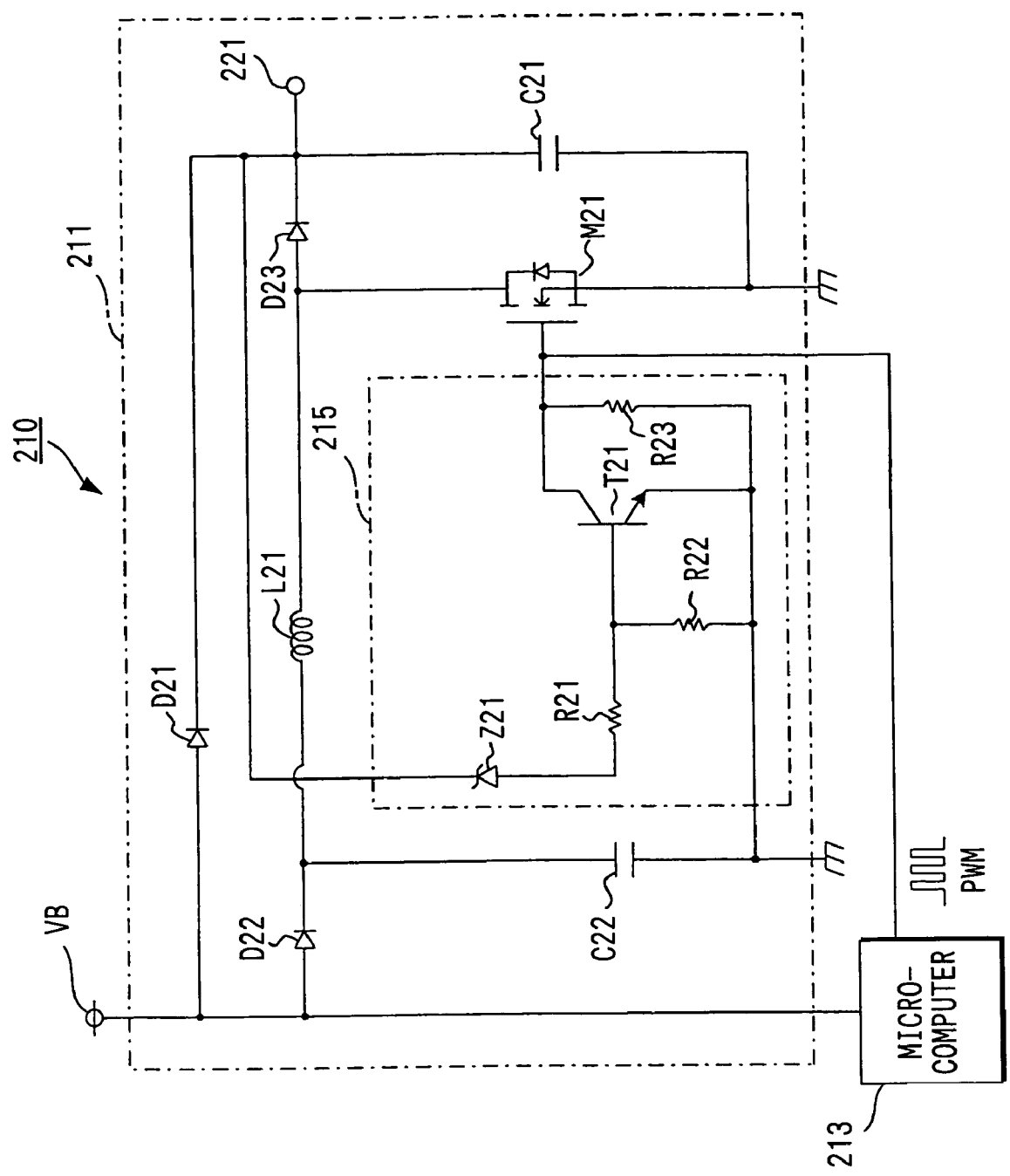
FIG. 1 is a circuit diagram showing a voltage booster device as a first embodiment of the present invention.

A first embodiment of the present invention will be described with reference to FIG. 1. The voltage booster device 210 is composed of: a booster circuit 211 that boosts a direct current power source voltage VB and outputs the boosted voltage from the output terminal 221 as an output voltage Vout; a microcomputer 213 that supplies voltage-boosting signals (pulse-width-modulated signals, referred to as PWM signals) to the booster circuit 211 when the power source voltage VB becomes lower than a minimum voltage Vmin; and a voltage-suppressing circuit 215 that suppresses operation of the booster circuit 211 based on the output voltage Vout.

The booster circuit 211 is composed of a coil L21, a diode D21, a pair of reverse-current-preventing diodes D22, D23, an N-channel field effect transistor (FET) M21, a smoothing capacitor C21, and an input capacitor C22. These components are connected as shown in FIG. 1. The voltage-suppressing circuit 215 is composed of an NPN transistor T21, a Zener diode Z21, and resistors R21, R22, R23. A collector of the transistor T21 is connected to a gate of the FET M21, a base of the transistor T21 is connected to a junction of the resistors R21 and R22, and an emitter of the transistor T21 is connected to the gate of the FET M21 through the resistor R23. A drain of the FET M21 is connected to the power source voltage VB through the diode D22 and the coil L21, and a source of the FET M21 is grounded.

A Zener voltage Vz(Z21) of the Zener diode Z21 is set to a level of a target voltage of the booster device (e.g., 10 volts). The resistors R21 and R22 are set to the levels so that a divided voltage Vd at the junction of the resistors R21 and R22 becomes higher than a turn-on voltage of the transistor T21. When the power source voltage VB becomes lower than the minimum voltage Vmin, the microcomputer 213 outputs the voltage-boosting signals (PWM signals) which are supplied to the gate of the FET M21. The power source voltage VB is boosted to the output voltage Vout and supplied to the output terminal 221.

When the output voltage Vout reaches the Zener voltage Vz(Z21) in the course of the voltage-boosting, the Zener diode Z21 becomes conductive, turning on the transistor T21. Upon turning on the transistor T21, the gate voltage of the EFT M21 becomes low level irrespective of the voltage level of the PWM signals from the microcomputer 213. Thus, the voltage-boosting in the booster circuit 211 is suppressed. That is, the output voltage Vout is kept at the same level as the Zener voltage Vz(Z21), and accordingly variations or changes in the output voltage Vout is suppressed. Since the Zener voltage Vz(Z21) is set to a level lower than the permissible maximum voltage Vpm (e.g., 15 volts) in the voltage booster device 210, the voltage booster device 210 is prevented from being damaged by a high voltage even if the microcomputer 213 malfunctions and continuously outputs the voltage-boosting signals.

In the first embodiment described above, the booster circuit 211 functions as a boosting means, the diode D21 constitutes part of an outputting means, the Zener diode Z21 functions as first current-conducting-means, the transistor T21 constitutes part of first voltage-suppressing means, and the Zener voltage Vz(Z21) corresponds to a first predetermined voltage.

Figure 2:
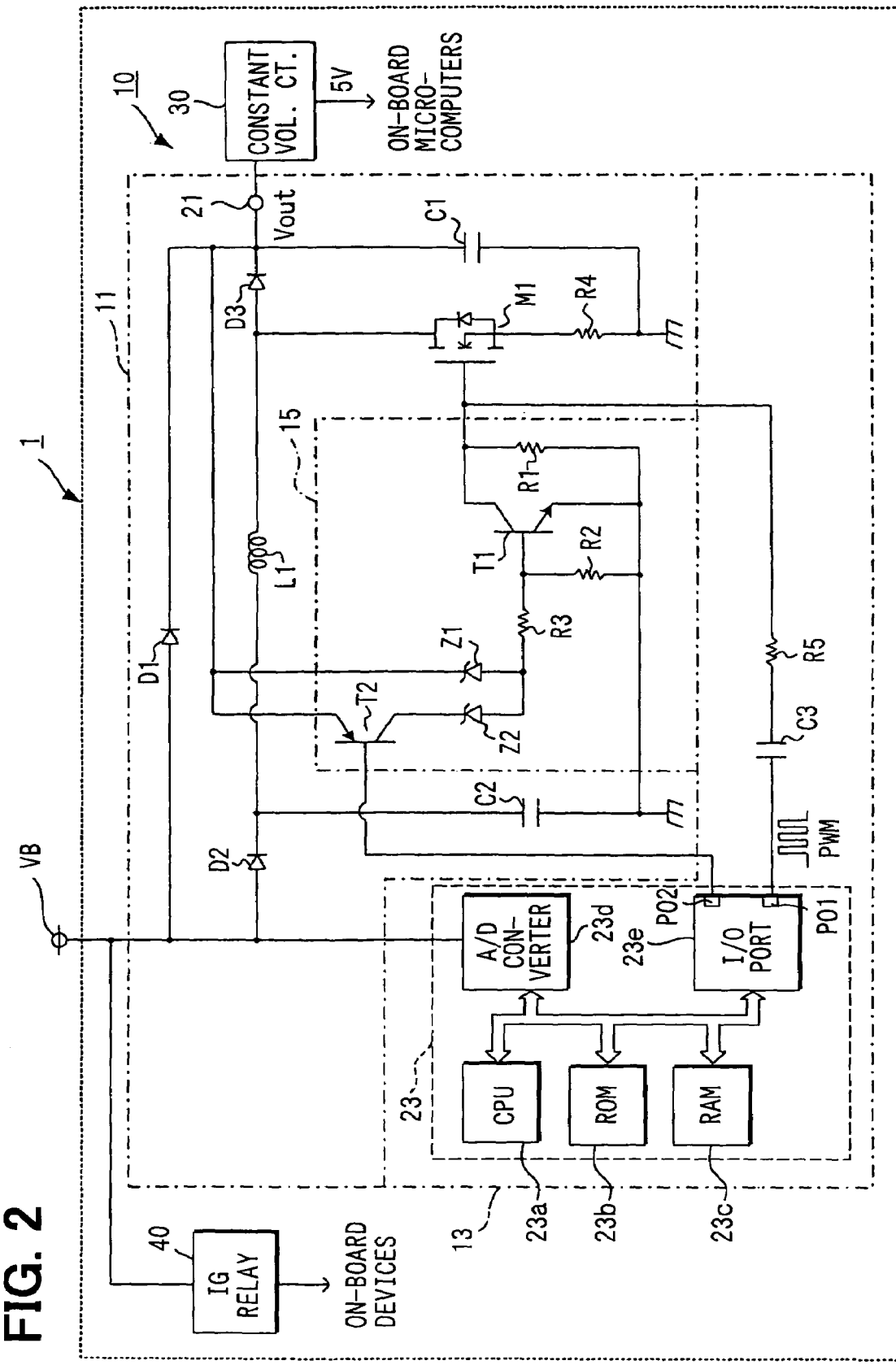
FIG. 2 is a circuit diagram showing a voltage booster device as a second embodiment of the present invention.
Figure 3:
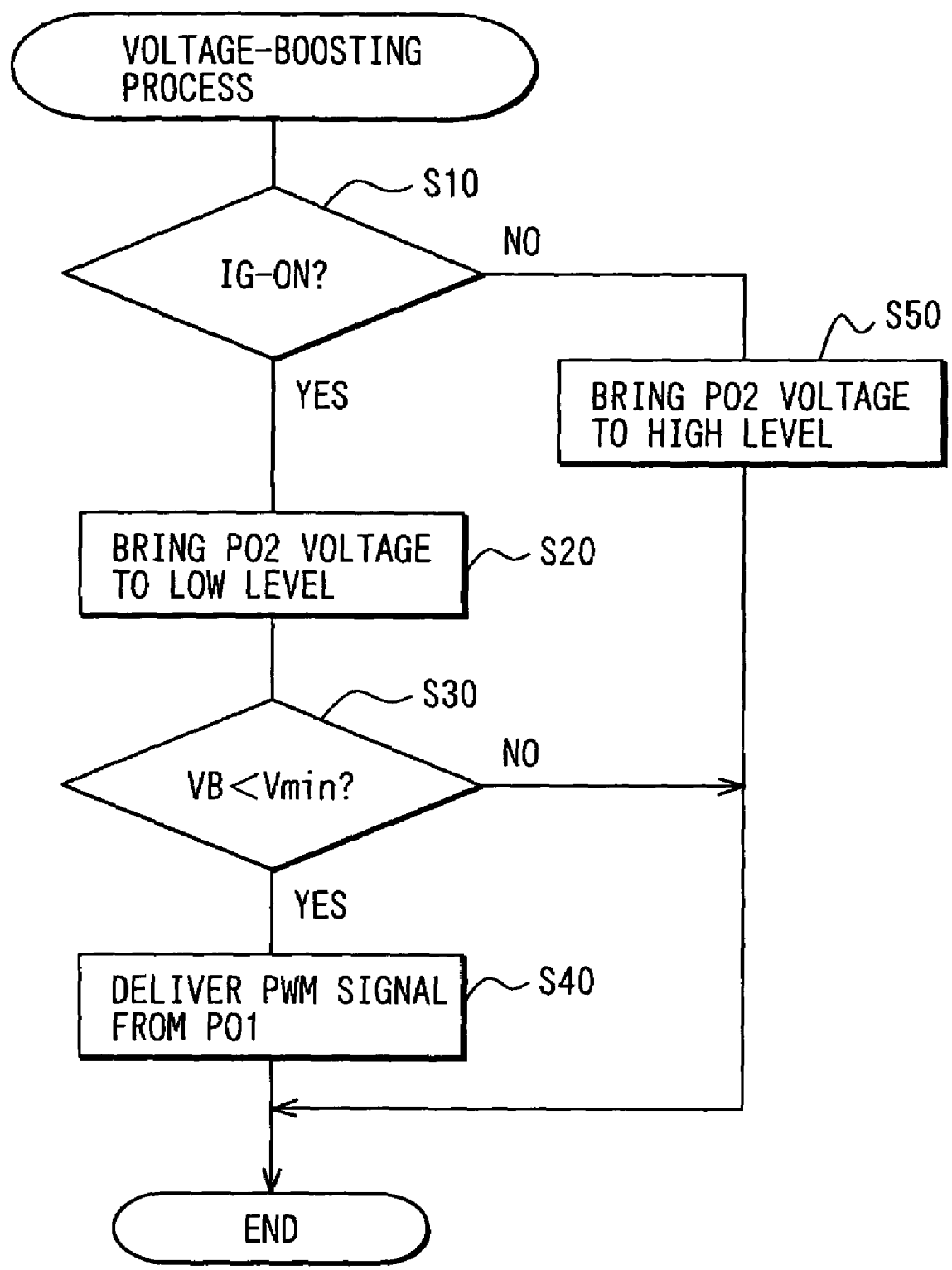
FIG. 3 is a flowchart showing a process of voltage-boosting by the voltage booster device shown in FIG. 2.
Figure 4A:
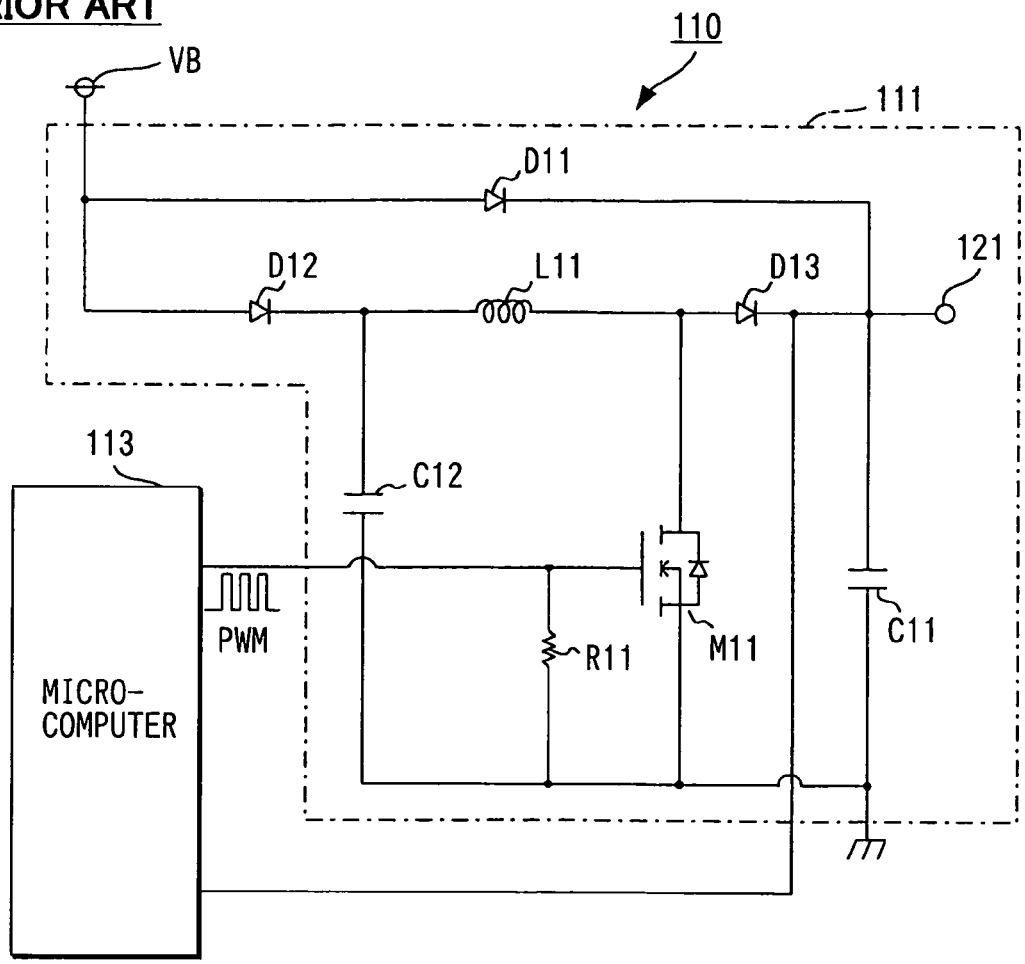
FIG. 4A is a circuit diagram showing a conventional voltage booster device.
Figure 4B:
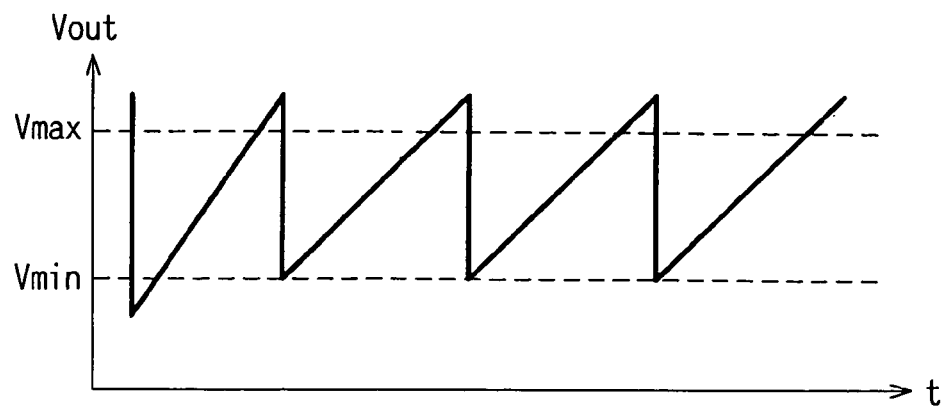
FIG. 4B is a graph showing variations in an output voltage during the voltage-boosting operation in the conventional device shown in FIG. 4A.

A second embodiment of the present invention will be described with reference to FIGS. 2 and 3. A power source system 1 shown in FIG. 2 is mounted on an automotive vehicle for supplying power to various electrical and electronic devices. The power source system 1 is composed of a voltage booster device 10 that boosts a power source voltage VB to an output voltage Vout, a constant voltage circuit 30 to which an output voltage Vout is supplied and from which a constant voltage of 5 volts is outputted, and an ignition relay 40 that is closed upon closing an ignition switch (not shown) to supply the power source voltage VB to various on-board devices. The constant voltage of 5 volts outputted from the constant voltage circuit 30 is supplied to devices such as on-board microcomputers.

The voltage booster device 10 is composed of a booster circuit 11 that boosts the power source voltage VB to the output voltage Vout, a controller 13 that outputs voltage-boosting signals (PWM signals) to the booster circuit 11, and a voltage-suppressing circuit 15 that suppresses operation of the booster circuit 11 according to the output voltage Vout.

The booster circuit 11 is composed of: a coil L1, one end of which is connected to the power source voltage VB through a reverse-current-preventing diode D2 and the other end of which is connected to an output terminal 21 through another reverse-current-preventing diode D3; a diode D1, one end of which is connected to the power source voltage VB and the other end of which is connected to the output terminal 21; an N-channel field effect transistor (FET) M1, a drain of which is connected to a junction of the coil L1 and the diode D3, a source of which is grounded through a resistor R4 and a gate of which is connected to the controller 13 so that the voltage-boosting signals (PWM signals) are supplied thereto; a smoothing capacitor C1 connected across the output terminal 21 and the ground; and an input capacitor C2, one end of which is connected to the power source voltage VB and the other end of which is grounded.

When the FET M1 is not operated, the direct current power source voltage VB is supplied to the output terminal 21 through the diode D1, thereby making the output voltage Vout equal to the power source voltage VB. When the FET M1 is operated, the power source voltage VB is boosted to the output voltage Vout. That is, energy accumulated in the coil L1 when the FET M1 is turned on is discharged to the output terminal 21 through the diode D3 when the FET M1 is turned off, and thereby a voltage Vout that is higher than the power source voltage VB appears at the output terminal 21. In other words, the booster circuit 11 boosts the power source voltage VB to the output voltage Vout when the PWM signals are supplied to the FET M1 from the controller 13. The resistor R4 functions as a fuse that is interrupted when an over-current flows therethrough due to malfunction of the FET M1. In this manner, the voltage booster device 10 is prevented from being fatally damaged by the malfunction of the FET M1.

The voltage-suppressing circuit 15 includes: an NPN transistor T1 that controls the operation of the FET M1; a Zener diode Z1 having a Zener voltage Vz(Z1), e.g., 15 volts; a Zener diode Z2 having a Zener voltage Vz(Z2), e.g., 10 volts; and an PNP transistor T2 that controls current conduction through the Zener diode Z2. The Zener voltage Vz(Z1) is set to a level lower than the permissible maximum voltage Vpm in the power source system 1 and higher than a nominal voltage Vn (e.g., 12 volts) in the power source system 1.

A collector of the transistor T1 is connected to the gate of the FET M1 and to the ground through a resistor R1. An emitter of the transistor T1 is grounded. One end of the Zener diode Z1 is connected to the base of the transistor T1 through a resistor R3 and to the ground through resistors R3 and R2, and the other end of the Zener diode Z1 is connected to the output terminal 21. One end of the Zener diode Z2 is connected to the base of the transistor T1 through the resistor R3 and to the ground through the resistors. R3 and R2, and the other end of the Zener diode Z2 is connected to a collector of the transistor T2. An emitter of the transistor T2 is connected to the output terminal 21. A base of the transistor T2 is connected to an output port PO2 of an I/O port 23e (explained later) so that the transistor T2 is turned on and off according to a voltage level of the output port PO2. The transistor T2 is turned on when its base is at a low level and is turned off when its base is at a high level. The resistors R2 and R3 are set to the levels so that a divided voltage Vd1 at a junction of R2 and R3 becomes higher than an ON-voltage of the transistor T1. The resistors R1 and R5 (explained later) are set to make a divided voltage Vd2 at a junction of R1 and R5 higher than an ON-voltage of the FET M1.

The voltage-suppressing circuit 15 described above operates in the following manner. When the transistor T2 is turned on, the transistor T1 is turned off, if both of the Zener diodes Z1, Z2 are not conductive. On the other hand, if either one of the Zener diodes Z1, Z2 is conductive, the transistor T1 is turned on. When the transistor T2 is turned off, the Zener diode Z2 does not become conductive even if the output voltage Vout at the output terminal 21 exceeds the Zener voltage Vz(Z2) because the output voltage Vout is not supplied to the Zener diode Z2. This means that a Zener diode for turning on the transistor T1 is selected from Zener diodes Z1 or Z2 by turning on or off the transistor T2.

The controller 13 is composed of a known microcomputer 23. The microcomputer 23 includes: a CPU 23a that operates according to predetermined programs; a ROM 23b that stores various programs therein; a RAM 23c that stores various data therein; an A/D converter 23d that converts the power source voltage VB to a digital amount; and an I/O port 23e having plural input ports and output ports. The I/O port 23e includes an output port PO1 connected to the gate of the FET M1 through a coupling capacitor C3 and a resistor R5, and an output port PO2 connected to the base of the transistor T2.

The controller 13 described above operates in the following manner. The CPU 23a controls a process of voltage-boosting in the voltage booster device 10, as shown in FIG. 3. The process shown in FIG. 3 is repeatedly performed during a period in which the ignition switch (not shown) is being turned on. At step S10, whether the ignition switch is turned on or not is checked. If the ignition switch is turned on, the process proceeds to step S20, where the voltage level at the output port PO2 is brought to a low level. Then, at step S30, whether the power source voltage VB is lower than the minimum voltage Vmin (e.g., 9 volts at which the voltage-boosting operation is to be started) is determined. If VB is lower than Vmin, the process proceeds to step S40, where the voltage-boosting signals (PWM signals) are outputted from the output port PO1. Then, the process comes to the end. On the other hand, if it is determined that VB is higher than Vmin at step S30, the process directly comes to the end. If it is determined at step S10 that the ignition switch is turned off, the process proceeds to step S50, where the voltage level at the output port PO2 is brought to a high level. Then, the process comes to the end.

The voltage booster device 10 described above operates in the following manner as a whole. During a period in which the ignition switch is turned on, the output voltage Vout becomes equal to the power source voltage VB if the power source voltage VB is higher than the minimum voltage Vmin (e.g., 9 volts). If VB is lower than Vmin, the power source voltage VB is boosted by operating the FET M1 in an on-off fashion according to the voltage-boosting signals (PWM signals) supplied from the controller 13. When the output voltage Vout reaches the Zener voltage Vz(Z2), e.g., 10 volts, the Zener diode Z2 becomes conductive to thereby turn on the transistor T1. The FET M1 is turned off irrespective of the level of the PWM signals because its gate is brought to a low level. Thus, the voltage-boosting operation is suppressed, and the output voltage Vout is kept at the same level as the Zener voltage Vz(Z2).

During a period in which the ignition switch is turned off, the output voltage Vout is the same as the power source voltage VB, irrespective of the level of VB, because no voltage-boosting signals (PWM signals) are supplied from the controller 13. In this period, the Zener diode Z2 does not become conductive even if the power source voltage VB is higher than the Zener voltage Vz(Z2), e.g., 10 volts, because the transistor T2 is kept turned off. Power consumption in the power source system 1 is kept low because no voltage-boosting operation is performed in this period.

In case the voltage-boosting signals continue to be supplied due to malfunction in the controller 13 during the period in which the ignition switch is turned off, the power source voltage VB continues to be boosted. However, the voltage-boosting is stopped when the output voltage Vout reaches the Zener voltage Vz(Z1), e.g., 15 volts, because the Zener diode Z1 becomes conductive to turn on the transistor T1. Upon turning on the transistor T1, the gate of the FET M1 is brought to a low level, thereby stopping the voltage-boosting operation. This means that the output voltage Vout is prevented from becoming higher than the Zener voltage Vz(Z1) in any event.

In the case where the Zener diode Z2 is damaged and becomes always non-conductive, current can be conducted through the Zener diode Z1. Therefore, the output voltage Vout does not exceed the Zener voltage Vz(Z1), e.g., 15 volts. Similarly, in the case where the Zener diode Z1 is damaged, the output voltage does not exceeds the Zener voltage Vz(Z2) because current is conducted through the Zener diode Z2. This means that the output voltage Vout does not exceed the permissible maximum voltage Vpm in the booster device 10 if either one of the diodes Z1, Z2 is damaged. Therefore, the power source system 1 is well protected from the over voltage.

In the second embodiment described above, the booster circuit 11 functions as voltage-boosting means, the diode D1 constitutes part of outputting means, the Zener diode Z1 functions as seeend first current-conducting means, the Zener diode Z2 functions as second current-conducting means, the transistor T1 functions as voltage-suppressing means, and the transistor T2 and controller 13 function as control means. The Zener voltage Vz(Z1) corresponds to a first predetermined voltage, and the Zener voltage Vz(Z2) corresponds to a second predetermined voltage.

The present invention is not limited to the embodiment described above, but it maybe variously modified. For example, though the voltage booster device 10 is mounted on an automobile in the second embodiment described above, the voltage booster device 10 may be used in other systems. Though the operation of voltage-boosting is prohibited when the ignition switch is turned off in the second embodiment, the prohibiting conditions maybe set according to application of the voltage booster device. The Zener diode Z21 used in the first embodiment and the Zener diodes Z1, Z2 used in the second embodiment may be replaced with switching elements which are controlled by a microcomputer based on the output voltage Vout.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A voltage booster device comprising:
    means for boosting a direct current power source voltage upon receiving a voltage-boosting signal;
    means for outputting either the power source voltage or a voltage boosted by the boosting means, whichever higher, as an output voltage;
    first current-conducting means for conducting current when the output voltage becomes higher than a first predetermined voltage set to a level lower than a permissible maximum voltage in the voltage booster device;
    second current-conducting means for conducting current when the output voltage becomes higher than a second predetermined voltage set to a level lower than the first predetermined voltage;
    voltage-suppressing means for suppressing operation of the boosting means when current is conducted through either the first current-conducting means or the second current-conducting means; and
    control means for supplying the voltage-boosting signal to the boosting means when the power source voltage is lower than a minimum voltage set to a level lower than the second predetermined voltage,
    wherein:
    the first predetermined voltage is set to a level higher than a nominal voltage of the power source; and
    operation of the control means and the second current-conducting means is prohibited under a predetermined prohibiting condition.

2. The voltage booster device as in claim 1, wherein:
    the voltage booster is mounted on an automotive vehicle; and
    the predetermined prohibiting condition is a condition where an ignition key of the automotive vehicle is turned off.

3. The voltage booster device as in claim 1, wherein:
    at least either the first current-conducting means or the second current-conducting means is a Zener diode.

4. The voltage booster device as in claim 2, wherein:
    at least either the first current-conducting means or the second current-conducting means is a Zener diode.

5. The voltage booster device as in claim 1, wherein the voltage-suppressing means includes a transistor connected in series to the second current-conducting means.

6. The voltage booster device as in claim 2, wherein the voltage-suppressing means includes a transistor connected in series to the second current-conducting means, and operation of the transistor is stopped when the ignition key of the automotive vehicle is turned off.

* * * * *